(12) United States Patent
Reeves et al.

(10) Patent No.: US 8,200,790 B1
(45) Date of Patent: Jun. 12, 2012

(54) DYNAMICALLY IDENTIFYING CLIENT APPLICATIONS ON MOBILE DEVICES

(75) Inventors: Raymond Emilio Reeves, Olathe, KS (US); Ryan Alan Wick, Punta Gorda, FL (US); John Marvin Jones, III, Overland Park, KS (US); Prabhat Karki, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 132 days.

(21) Appl. No.: 12/501,942

(22) Filed: Jul. 13, 2009

(51) Int. Cl.
*G06F 15/177* (2006.01)
(52) U.S. Cl. ........................................... 709/220
(58) Field of Classification Search ............... 709/222, 709/220
See application file for complete search history.

(56) References Cited

U.S. PATENT DOCUMENTS

| 7,711,117 B1* | 5/2010 | Rohrle et al. ............ 380/270 |
| 7,941,656 B2* | 5/2011 | Hans et al. ................ 713/2 |
| 2007/0002868 A1* | 1/2007 | Qian et al. ............ 370/395.21 |
| 2010/0075648 A1* | 3/2010 | Matsuoka et al. ........... 455/418 |

FOREIGN PATENT DOCUMENTS

| WO | WO 2008032010 A2 * | 3/2008 |
| WO | WO 2008101547 A1 * | 8/2008 |

* cited by examiner

*Primary Examiner* — Ryan Jakovac

(57) ABSTRACT

A method and medium are provided for identifying a client application residing on a mobile communications device. The mobile device detects installation of a new client application, and provides information about the client to an application registration catalogue (ARC) on the mobile network. The ARC returns an application identifier corresponding to the client, which the mobile device inserts into access request headers sent by the client over the mobile network. By also including a request to update the identifier with a custom client identity agreed upon by a content provider or developer, mobile networks provide a trusted method of forwarding access requests to content providers.

6 Claims, 6 Drawing Sheets

DYNAMICALLY IDENTIFYING CLIENT APPLICATIONS ON MOBILE DEVICES

SUMMARY

Embodiments of the invention are defined by the claims below, not this summary. A high-level overview of embodiments of the invention are provided here for that reason, to provide an overview of the disclosure. This summary is not intended to identify key features or essential features of the claimed subject matter, nor is it intended to be used as an aid in isolation to determine the scope of the claimed subject matter.

In a first aspect, a set of computer-executable instructions provides an exemplary method for performing a method of identifying a client application installed on a mobile communications device. Embodiments of the exemplary method include receiving, at a mobile network node, an application characteristic from the mobile communications device. In embodiments, the application characteristic includes information about the client application. Embodiments of the exemplary method further include determining whether the client application is registered with the mobile network, and if the client application is registered with the mobile network, retrieving a pre-assigned application identifier corresponding to the client application. The application identifier can be provided to the mobile device for insertion into subsequent access request headers.

In a second aspect, a set of computer-executable instructions provides another exemplary method for identifying a client application installed on a mobile communications device. Embodiments of the exemplary method include monitoring mobile network traffic associated with a first web-enabled application and developing a service profile corresponding to the first application based on characteristics of the network traffic observed. Embodiments of the exemplary method can further include associating a client identity with the service profile. When an access request is received from a mobile access gateway (MAG), an application registration catalogue (ARC) can determine whether the access request includes information reflected in the service profile. If so, the ARC can provide an associated client identity to the MAG.

In another aspect, a set of computer-executable instructions provides another exemplary method for registering a client application with a mobile network. Embodiments of the illustrative method include detecting an installation of a client application on a mobile communications device. An application characteristic of the client application can be determined and provided to a mobile network node. In embodiments, the exemplary method further includes receiving an application identifier corresponding to the client application from the mobile network node.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
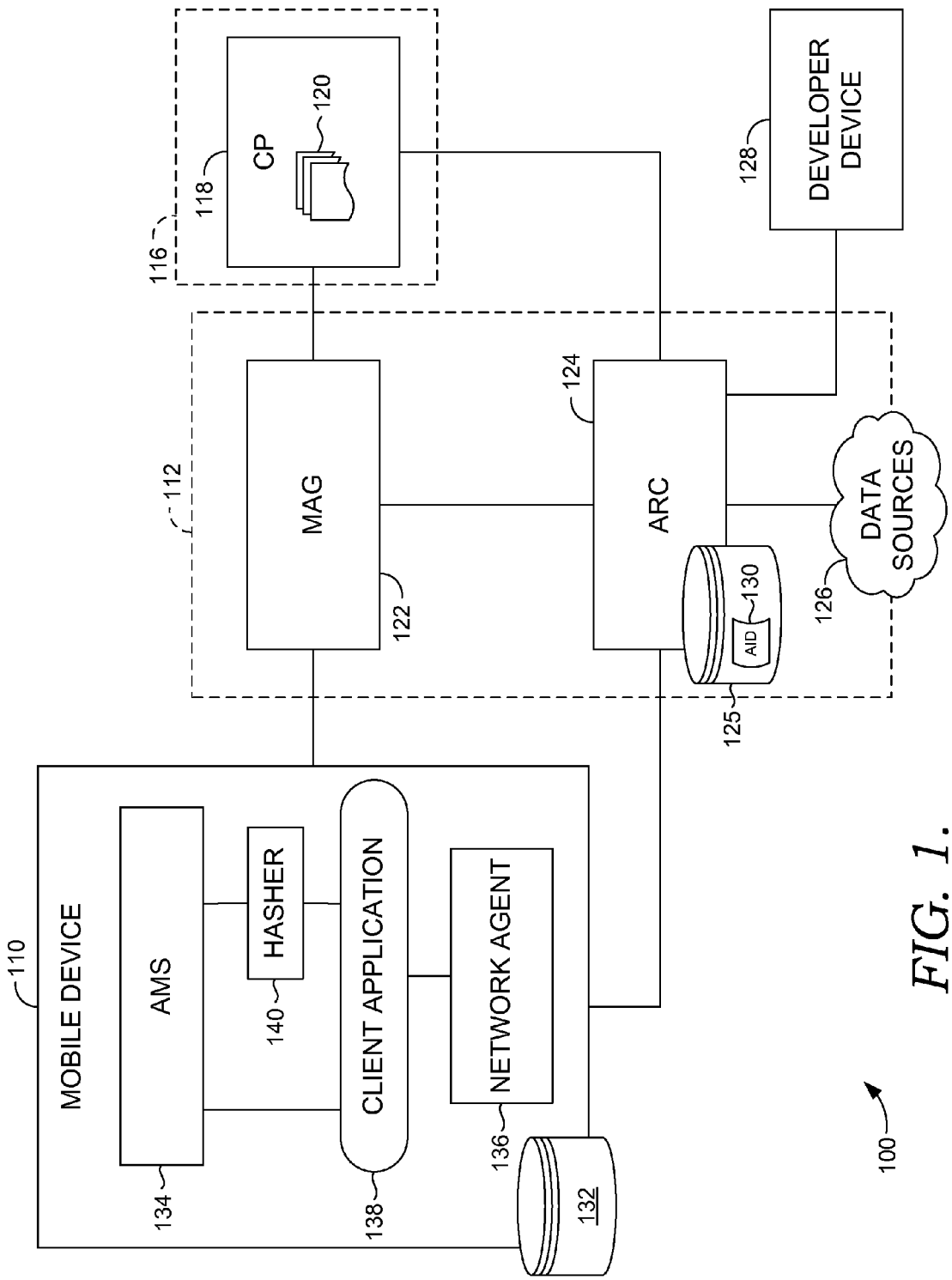
FIG. 1 depicts an illustrative network environment in accordance with embodiments of the present invention.

Embodiments of the present invention provide systems and methods for uniquely identifying client applications associated with web enabled applications. By implementing embodiments of the invention, mobile network operators can enhance the personalization and security of their application offerings.

The subject matter of the present invention is described with specificity herein to meet statutory requirements. However, the description itself is not intended to limit the scope of this disclosure to only the embodiments described herein. Rather, the inventors have contemplated that the claimed subject matter might also be embodied in other ways, to include different steps or combinations of steps similar to the ones described in this document, in conjunction with other technologies. Moreover, although the terms "step" and/or "block" may be used herein to connote different components of methods employed, the terms should not be interpreted as implying any particular order among or between various steps herein disclosed except when the order of individual steps is explicitly asserted.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AMS | Application Management System |
| ARC | Application Registration Catalogue |
| CCI | Catch-all Client Identity |
| CDMA | Code Division Multiple Access |
| CDN | Content Delivery Network |
| CD-ROM | Compact Disc Read-Only Memory |
| CP | Content Provider |
| DVD | Digital Versatile Disc |
| EDGE | Enhanced Data Rates for GSM Evolution |
| EEPROM | Electrically Erasable Programmable Read-Only Memory |
| EV-DO | Evolution-Data Optimized |
| GPRS | General Packet Radio Service |
| GSM | Global System for Mobile Communications |
| HA | Home Agent |
| HTTP | Hyper-Text Transfer Protocol |
| ID | Identity or Identifier |
| MAG | Mobile Access Gateway |
| PC | Personal Computer |
| PDA | Personal Digital Assistant |
| RAM | Random Access Memory |
| ROM | Read-Only Memory |
| UMTS | Universal Mobile Telecommunications System |
| URI | Uniform Resource Identifier |
| Wi-Max | Worldwide Interoperability for Microwave Access |

Embodiments of the present invention may be embodied as, among other things: a method, system, device, or set of instructions embodied on one or more computer-readable media. Computer-readable media include both volatile and nonvolatile media, removable and nonremovable media, and contemplates media readable by a database, a switch, a server, a communications device and various other devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Turning now to FIG. 1, an illustrative network environment 100 suitable for implementation of embodiments of the present invention is depicted. Illustrative network environment 100 includes a mobile device 110 that accesses services via a mobile network 112. Exemplary services can include mobile communications services (e.g., telephony, instant messaging, social networking, etc.), mobile data services (e.g., e-mail, information updates, etc.), mobile web services (e.g., mobile internet access), and the like. Illustrative network environment 100 also includes a content delivery network (CDN) 116, and a developer device 128. The exemplary network environment 100 shown in FIG. 1 is an example of one suitable network environment 100 and is not intended to suggest any limitation as to the scope of use or functionality of embodiments of the inventions disclosed throughout this document. Neither should the exemplary network environment 100 be interpreted as having any dependency or requirement related to any single component or combination of components illustrated therein. For example, in various embodiments, components of mobile network 112 can be implemented in any number of configurations, using any number of machines, and the like.

In embodiments of the present invention, mobile device 110 can be any kind of mobile communications device or mobile media device (e.g., a Zune® device, an mp3 player, etc.). In some embodiments, mobile device 110 includes radio equipment that facilitates the transmission of wireless communication signals to and from mobile device 110. Illustrative protocols that can be utilized in connection with embodiments of the present invention include CDMA, EDGE, EV-DO, GPRS, GSM, UMTS, Wi-Fi™, WiMAX, and the like. Radio equipment can facilitate wireless communications between mobile device 110 and a local, regional, national, or even global, telecommunications network. For example, in embodiments, mobile device 110 can be a mobile phone, a personal digital assistant (PDA), a mobile computer, a pocket PC, and the like. Mobile device 110 can also include an operating environment that can include an operating system, applications, and the like. For example, in embodiments, mobile device 110 can include a Windows® Mobile operating system, produced by Microsoft® Corporation of Redmond, Wash. In other embodiments, mobile device 110 can include operating systems such as mobile platforms developed by other entities, partnerships, open-source alliances, and the like.

According to embodiments of the present invention, mobile device 110 includes one or more processors that are capable, among other things, of executing computer-executable instructions embodied on computer-readable media. Computer-readable media can be generally referred to as memory 132, and can include the various types of media described above. In embodiments, processor(s) execute program modules, instructions, applications, and the like, that are stored in memory 132. In doing so, processor(s) can cause mobile device 110 to perform aspects of the various functions and processes described herein. Additionally, it should be understood that the illustration in FIG. 1 depicting memory 132 is not intended to imply that processors and memory 132 are found only in mobile device 110. These illustrative components are similarly found in other components of the exemplary network environment 100 such as, for example, MAG 122, ARC 124, CP 118, developer device 128, and the like. That is to say that any component described herein as performing operations as a result of execution of computer-executable instructions includes, or has access to, one or more processors and some form of memory containing computer-readable media having computer-executable instructions embodied thereon.

As is further illustrated in FIG. 1, mobile device 110 includes an application management system (AMS) 134, a network agent 136, a client application 138, and a hasher 140. AMS 134 can be any type of application management system capable of managing a set of applications and/or client applications 138. As used herein, a client application includes a client portion of an application that works in connection with a client computer (or other computing device such as, for example, a mobile device 110) and a server computer (e.g., a content provider (CP) 118). A client application is not limited to a stand-alone application that runs autonomously on a client machine, but rather refers to an application on a client machine that communicates with a corresponding server application hosted by a serving machine. AMS 134 can be used to perform a variety of different functions on the mobile device 110 such as launching MIDlets and other applications and/or client applications 138. In embodiments, AMS 134 allows for lifecycle management of applications, client applications, and event handlers.

Network agent 136 can be any type of agent, software module, program or program module capable of facilitating wireless communications over mobile network 112. Network agent 136 can be configured to communicate with various elements of mobile network 112, CDN 116, and the like. For example, in an embodiment, network agent 136 communicates with ARC 124, while in other embodiments, network agent 136 communicates with MAG 122. In further embodiments, network agent 136 can communicate with both MAG 122 and ARC 124.

According to embodiments of the invention, network agent 136 can be a general module that facilitates a large portion of network traffic between mobile device 110 and mobile network 112. In other embodiments, network agent 136 is application-specific. For example, in some embodiments, network agent 136 is created by, or in conjunction with, client application 138. Client application 138 can include program modules, applications, methods, routines, and the like that interact, according to some variation of a client-server relationship, with a content provider 118 to provide application services, access to media, access to content, and the like. In various embodiments, AMS 134 communicates with client application 138 to register application client 138, to invoke client application 138, and the like.

With continuing reference to FIG. 1, mobile device 110 further includes a hasher 140. Hasher 140 can be any type of program, program module, software module, and the like that is capable of determining application characteristics corresponding to client application 138. In embodiments, application characteristics can include any information about client application 138 that could be useful in distinguishing client application 138 from other client applications, applications, programs, and services. In embodiments, hasher 140 can communicate with ARC 124 to manage registration of new client applications 138. In some embodiments, hasher 140 determines any application characteristic of client application 138 that is capable of being determined such as, for example, information about the source domain of client application 138 (e.g., where client application 138 comes from, the type of media from which it was loaded, etc.), developer identifiers corresponding to developers of client application 138, vendor names, and the like.

In operation, for example, when AMS 134 detects an installation of a new client application 138, AMS 134 invokes hasher 140 to determine characteristics thereof. These characteristics, along with a first identifier of the client application 138 are stored in memory 132 until they can be provided to ARC 124. In embodiments, upon detecting installation of a new client application 138, the client application 138 is added to a list of new client applications. In some embodiment, no traffic associated with application service 138 is allowed to flow in or out of mobile device 110 until the new client application 138 can be registered with mobile network 112.

Mobile network 112 includes network nodes such as a mobile access gateway (MAG) 122 and an application registration catalogue (ARC) 124. Of course, mobile network 112 can include other network nodes and components such as, for example, home agents (HAs), media servers, application servers, routers, switches, access servers, and the like. Network components like those are well-known and are not germane to the inventive features of the present invention, and accordingly, will not be treated in detail herein. In some embodiments, MAG 122 and/or ARC 124 can be implemented on separate machines, while in other embodiments, MAG 122 and ARC 124 can be implemented on a single machine or distributed across many machines. In further embodiments, MAG 122 and/or ARC 124 can be integrated with other network nodes and components.

Mobile access gateway (MAG) 122 facilitates access by users and mobile devices 110 to various services, content, applications, and the like, on the mobile network 112. In embodiments, MAG 122 can include other functions as well, such as facilitating registration, de-registration, authentication, authorization, and accounting processes. For example, in one embodiment, MAG 122 is a Mobile Access Gateway function developed by Openwave® and can handle application registrations and HTTP traffic between mobile device 110 and CDN 116. In other embodiments, MAG 122 can include gateway and access functions designed and developed by other entities and for other purposes.

In operation, MAG 122 receives an access request from mobile device 110. Access requests can include any kind of request for access to services, media, content, application-hosting services, and the like. For example, mobile device 110 can communicate an access request to MAG 122 in an attempt to gain access to application content 120 maintained, stored, and/or hosted by a content provider (CP) 118. In embodiments, an access request originates from a client application 138 located on mobile device 110. According to various embodiments of the invention, MAG 122 forwards identifying information included in an access request to ARC 124. ARC 124 manages a catalogue 125 containing identifiers 130 such as, for example, application identifiers, client identities, source domains that and the like. ARC 124 can also perform various dynamic functions to facilitate providing application identifiers to MAG 122 when requested.

For example, ARC 124 can communicate with a developer device 128 to allow a developer of an client application 138 to configure the client application 138. Additionally, developers can specify policies and rules via developer device 128. For example, in an embodiment, developers can agree upon custom client identities corresponding to client applications 138 that they develop. Similarly, CP 118 can agree upon custom client identities, application identifiers, rules, policies, and the like. Additionally, ARC 124 can enforce rules and policies derived from additional data sources 126. Additional data sources can be any type of network node, computing device, individual, database, or the like which can provide rules, policies, and the like for ARC 124 to enforce in relation to dynamic assignment of application identifiers, client identities, and the like.

In some embodiments, CP 118 can be located within a CDN 116, within mobile network 112, or independent thereof. In some embodiments, CP 118 can be implemented on a communications device such as a mobile phone, a PDA, a portable media player, or the like. In other embodiments, CP 118 can be implemented on a personal computer, dedicated computer, microcomputer, distributed computer system, or the like. As illustrated in FIG. 1, CP 118 hosts application content 120. According to various embodiments of the invention, application content 120 can include any type of content, media, program modules, applications, services, and the like that facilitate mobile device 110 running a corresponding client application 138. For example, application content 120 can include the content, instructions, data, or the like necessary for allowing a user of mobile device 110 to play online games, access e-mail accounts, browse the Internet, and the like.

According to various embodiments, MAG 122 forwards access request headers, invocation methods, URIs associated with CP 118, and the like, to ARC 124. In return, ARC 124 can respond to MAG 122 by providing a client identity (e.g., an identifier associated with a corresponding client application residing on mobile device 110) to MAG 122 so that MAG 122 can include the client identity with the access request when forwarding the access request to CP 118. In some embodiments, MAG 122 can perform additional security and identifying functions such as, for example, by generating a trust token, or trust hash, using a mechanism agreed upon by CP 118.

The exemplary network environment 100 described above with reference to FIG. 1 can be used to facilitate dynamic and secure application registration on a mobile network. In conventional mobile network environments, developers can implement wireless-web enabled applications and can deploy client applications corresponding to the same for consumption by customers of a mobile network. When these client applications interact with content providers, for example, by using communication protocols such as HTTP, the client applications have an opportunity to inform the content provider of the client application's identity. However, in conventional systems, client applications are not required to identify themselves and are not inherently barred from spoofing identifiers that are already being used and assigned to other client applications. For example, in embodiments, Java client applications may send traffic impersonating web browser traffic. Because content providers may be able to provide different experiences or perform content selection based in part on the identity of the client application, the lack of trust regarding the client's identity reduces the content provider's ability to enhance the user's experience. Additionally, the mobile network may not be able to effectively classify HTTP web traffic based on application types and categories. Situations such as the one described here can be risky as mobile network providers continue to open their platforms and explore fully opened development strategies.

To mitigate the risk described above, the present invention includes an architectural approach that leverages mobile network operator's relationships with content providers as well as components of the wireless web mobile devices deployed by mobile network operators. At a high level, the present invention exploits the application management system (AMS), mobile access gateway (MAG) technology, and a new request directive employed by the serving MAG, as well as creation of a new network component referred to herein as an application registration catalogue (ARC).

The present invention includes modifications to the AMS such that upon download and/or installation of new client applications, the AMS reports to an ARC information about application binaries, which can include, for example, information such as the binary's checksum, a hash based on a mobile network operator-defined algorithm, information about the type of device upon which the client application is installed, information about the source domain, and information about the identity of the developer of the client application. In response, the ARC verifies whether the client application is already registered or otherwise known to the mobile network. The ARC generates or assigns a unique application identifier that is stored in the network and that is also shared with the AMS in the reporting mobile device.

For each content provider having a relationship with the mobile network, an offline administrative process can be utilized for allowing content providers to agree upon custom client identities for new client applications. Likewise, application developers may be able to negotiate custom client identities by submitting applications with the mobile network operator and having the applications registered with the ARC. The MAG is responsible, according to embodiments of the invention, for interacting with the ARC to ensure that the client identity forwarded to a content provider is legitimate. In some embodiments, a trust-hash (e.g., trust token) can be generated to be included in access requests, thereby enhancing the security of the associated HTTP traffic. According to various embodiments of the present invention, the ARC can include rules supporting the mapping of well-known, unidentified HTTP traffic to agreed-upon client identities based on, for example, HTTP request header name/value pairs, invocation methods, and URIs submitted by mobile devices. Additionally, in the absence of any means of uniquely identifying HTTP request traffic, a catch-all client identity (CCI) can be used to identify client applications.

Figure 2:
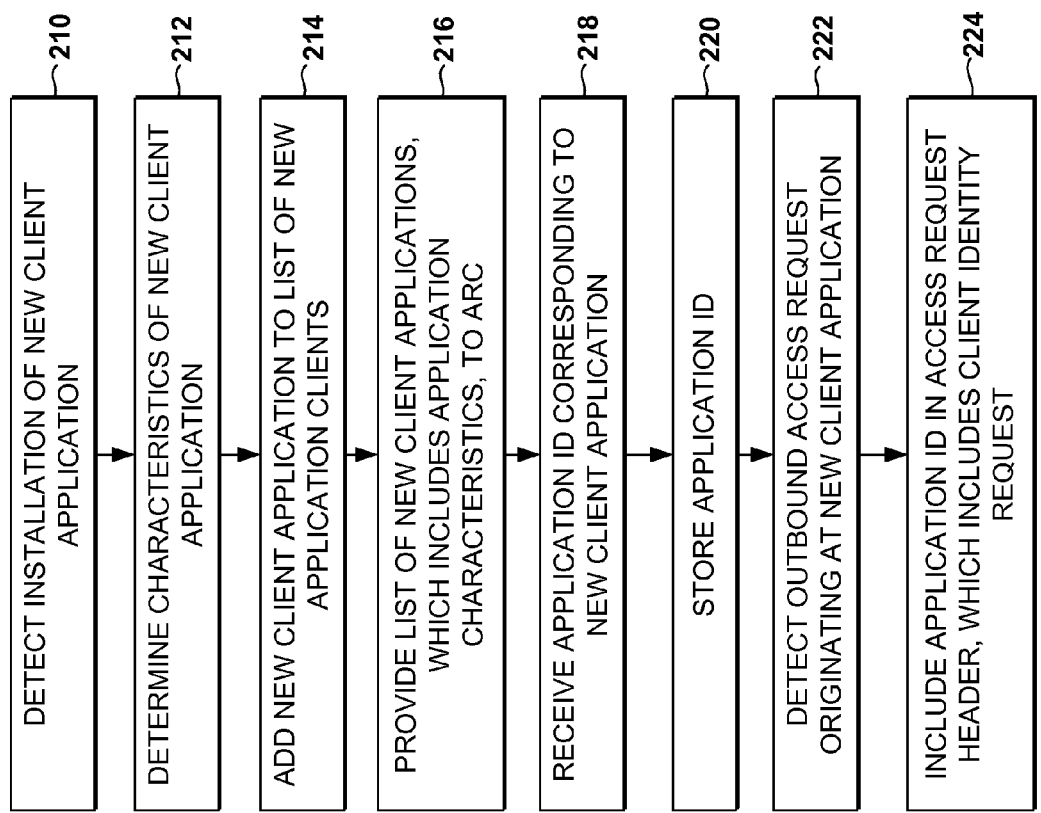
FIG. 2 depicts an illustrative method for identifying a client application to a content provider in accordance with embodiments of the present invention.

To recapitulate, we have described a computing system, a communications device, a network environment, and methods for dynamic and secure assignment of application identifiers and client identities. Turning to FIG. 2, a flow diagram is provided, showing an illustrative method of identifying a client application to a content provider. Embodiments of the exemplary invention include, at a first step 210, detecting installation of a new client application and, at a step 212, determining characteristics of the new client application. In embodiments, an AMS is configured to detect installation of new client applications on a mobile device. As described above, client applications can include client components configured to communicate with a content provider to facilitate running an application on the mobile device. Applications can include games, open-source web browsers, and the like. Characteristics of the new client application are determined by a hasher, which, in some embodiments, obtains any and all information capable of being ascertained such as, for example, the name of the corresponding application, a URI associated with a corresponding content provider, and the like can be determined by the hasher.

At step 214, the newly installed client application is added to a list of new client applications. In embodiments, the new client application will remain on the list of new client application until it can be registered on the mobile network. According to embodiments, no network traffic is allowed to pass to or from client applications on the list. As illustrated at step 216, the list of new client applications is provided to an ARC. The ARC responds with a list of application identifiers for each reported client application, which is received at step 218. The application identifier for the new client application can be stored, for example, in non-volatile memory, as depicted at step 220.

As shown at step 222, an outbound access request originating from the new client application is detected. For example, and AMS can be configured to detect HTTP traffic over the wireless web. When such information is sent, the mobile device platform includes a client identity request header. In embodiments, a client identity request header includes the application identifier and a request to update the identifier with a custom client identity, if any have been assigned to the client application. For example, developers and content providers can interact with the mobile network to agree upon custom client identities and the like. In embodiments, there may be no custom client identity agreed upon, in which case a default identity can be used.

Figure 3:
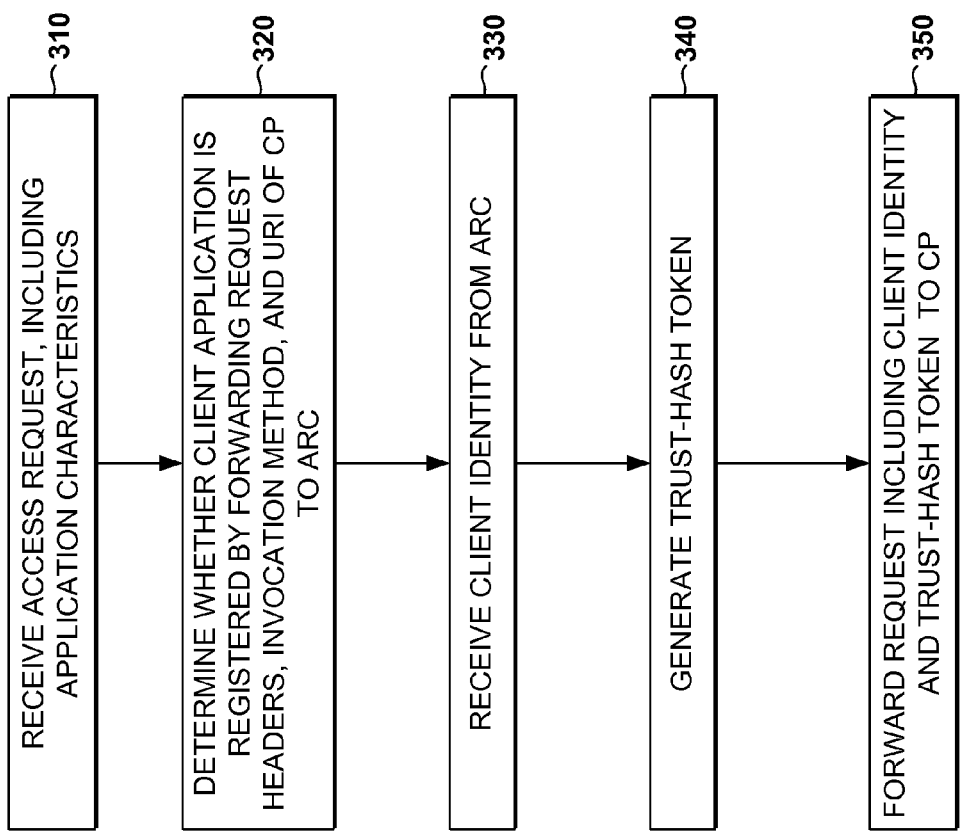
FIG. 3 depicts an illustrative method for handling an access request from a mobile device in accordance with embodiments of the present invention.

Turning to FIG. 3, a flow diagram is provided that depicts an exemplary method of handling an access request from a mobile device in accordance with embodiments of the present invention. According to a first illustrative step, step 310, an access request is received from a mobile device at a mobile access gateway (MAG). In embodiments, the access request is an HTTP request to access application content hosted by a content provider. The access request includes information identifying the client application from which the access request originates. In embodiments, for example, the access request can include HTTP request headers that include identifiers corresponding to the client application, invocation methods used by the client application, and URIs associated with a content provider corresponding to the client application.

As shown at a step 320, the MAG forwards the request headers, invocation method, and URI to an application registration catalogue (ARC). In embodiments, the MAG can forward other information found in the access request such as, for example, identifiers corresponding to the client application, domain information associated with the client application, domain information associated with the corresponding content provider, and the like. In return, the MAG receives a client identity from the ARC. In embodiments, the client identity can include a custom application identifier agreed upon by the content provider. In other embodiments, the client identity can include a custom application identifier agreed upon by the developer of the application. In still further embodiments, the client identity can include a default client identity or a client identity associated with well-known client applications that do not have a specific client application identifier. Well-known client applications can include those whose service profile includes consistent and recognizable patterns, methods, and the like.

As shown at step 340, the MAG generates a trust-hash token that the content provider has agreed upon. At a final illustrative step, step 350, the MAG forwards the access request to the content provider according to methods agreed upon by the content provider. As further depicted at step 350, the MAG includes with the access request the client identity received from the ARC and the trust-hash token generated by the MAG. In this manner, the content provider can receive the forwarded access request while trusting the identity reported therein of the client application, enhancing the ability of the content provider to facilitate a personalized user experience associated with corresponding application services.

Figure 4:
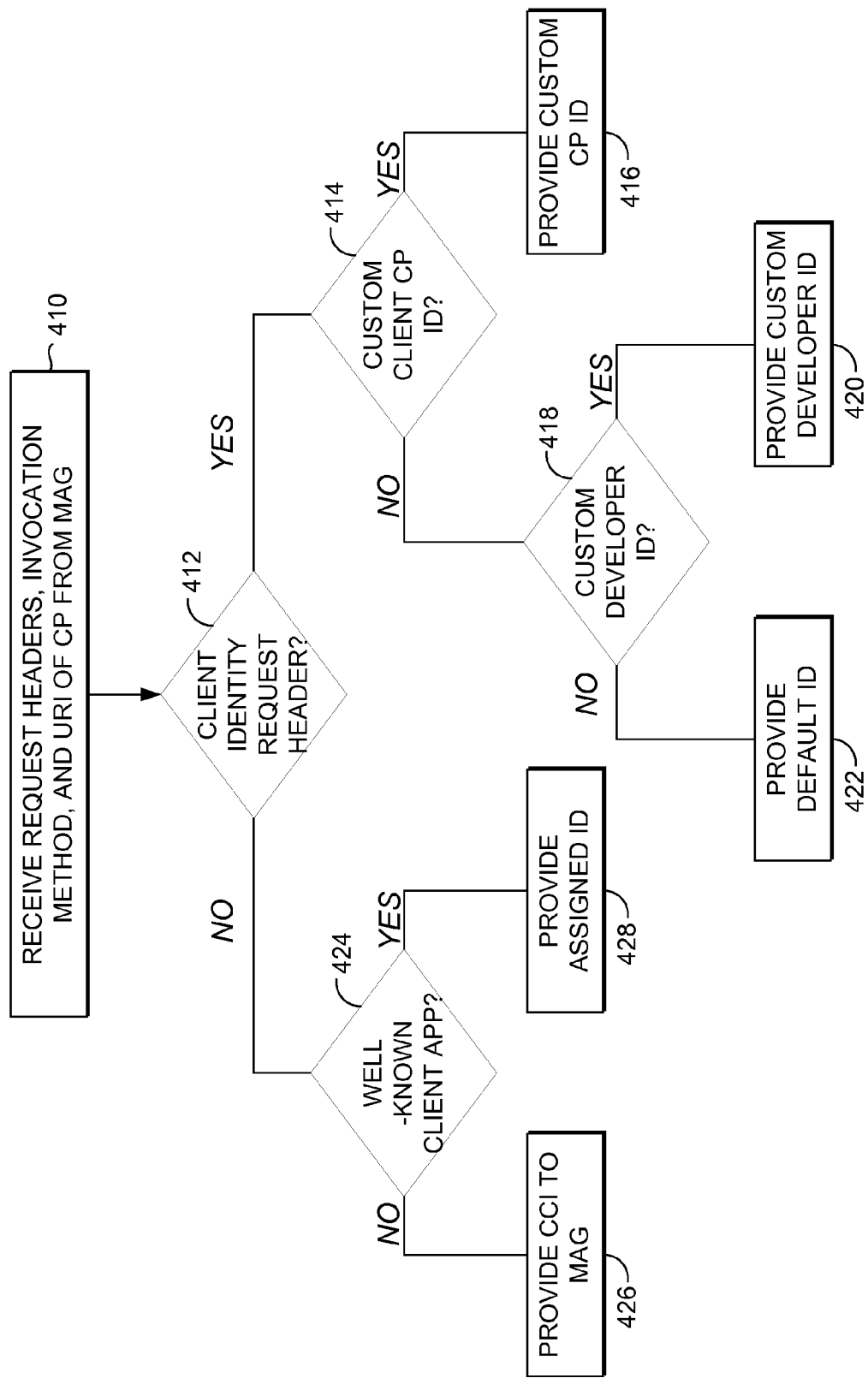
FIG. 4 depicts an illustrative method for dynamic assignment of an application identifier in accordance with embodiments of the present invention.

Exemplary methods for dynamic and secure assignment of an application identifier (and thus, in embodiments, a client identity) are reflected in the illustrative process depicted in the flow diagram of FIG. 4. Turning to FIG. 4, embodiments of the exemplary method include, at a first step 410, receiving information from an access request including request headers, invocation methods, and URIs associated with a corresponding content provider. In embodiments, other information can be received as well. As shown at step 412, the ARC determines whether the forwarded information includes a client identity request header. In embodiments, the client identity request header can include a request to replace, if appropriate, a given client application identifier with a custom client identity. Accordingly, as depicted at step 414, if the ARC observes a client identity request header, the ARC determines whether the forwarded information is associated with an application for which the corresponding content provider has agreed upon a custom client identity ("custom client CP ID"). If a custom client identity agreed upon by the content provider is implicated, the ARC provides that identity, as shown at step 416, to the MAG that forwarded the information in step 410.

As depicted at step 418, if there is not a corresponding custom identity agreed upon by the content provider, the ARC determines whether there is a corresponding custom developer identity (ID), which is a custom client identity agreed upon by a developer of the client application from which the original access request originated. If there is, the ARC provides that custom developer ID to the MAG, as depicted in step 420. If not, the ARC can provide a default ID, as shown at step 422. In embodiments, the default identifier can include the identifier initially assigned to the client application by the ARC during registration of the client application.

With continued reference to FIG. 4, if the ARC does not observe a client identity request header within the information received from the MAG in step 410, the ARC determines whether the client application is a well-known client application, as shown at step 424. The associated mobile network can include monitoring and analysis components that develop a service profile associated with a particular client application, which can serve as a unique fingerprint associated with that client application. The service profile can be generated by employing some form of heuristic fingerprinting that can include, for example, monitoring and recognizing name/value pairs in HTTP headers of communications associated with the client application, invocation methods associated with the client application, and URIs or other domain information associated with corresponding content providers. At step 426, if the client application is a well-known client, the ARC provides an identity assigned to the well-known client application to the MAG. If not, as depicted at step 428, the ARC can provide a catch-all client identity to the MAG. In embodiments, the catch-all client identity can be used when there are no other means available to uniquely identify or distinguish HTTP request traffic originating at the client application.

Figure 5:
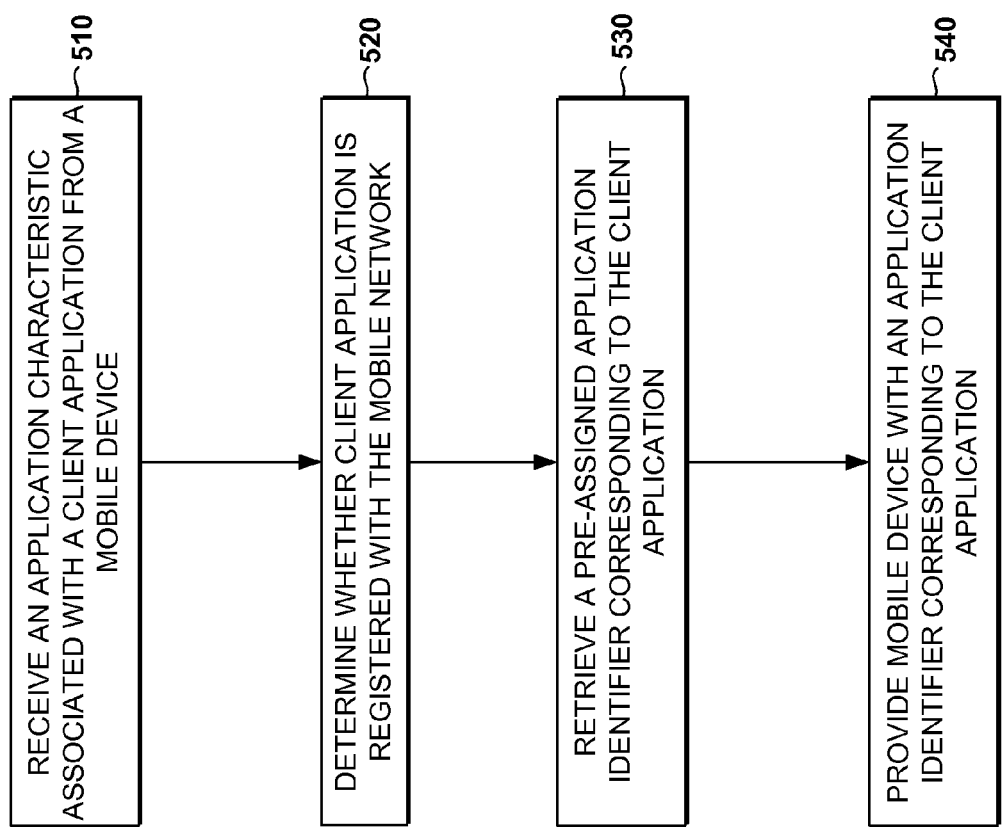
FIG. 5 depicts an illustrative method for identifying a client application installed on a mobile communications device in accordance with embodiments of the present invention.

Turning now to FIG. 5, an exemplary method of identifying a client application installed on a mobile communications device, wherein the client application is associated with a web-enabled application is depicted. According to embodiments of the exemplary method, a step 510 includes receiving, at a network node such as an ARC, an application characteristic associated with a client application from a mobile device. At step 520, the network node determines whether the client application is registered with the mobile network. In embodiments, the network node determines whether the client application is registered by referencing a listing of registered client applications maintained on the mobile network. If the client application, and thus the application, is registered with the mobile network, the ARC retrieves an application identifier corresponding to the client application, as depicted at step 530. In embodiments, the application identifier can include a default application identifier assigned to the client application upon registration. In other embodiments, the application identifier includes a custom application identifier agreed upon by either (or, in some cases, perhaps both) the developer of the application and/or a corresponding content provider. At a final illustrative step, step 540, the ARC provides the mobile device with an application identifier corresponding to the client application.

Figure 6:
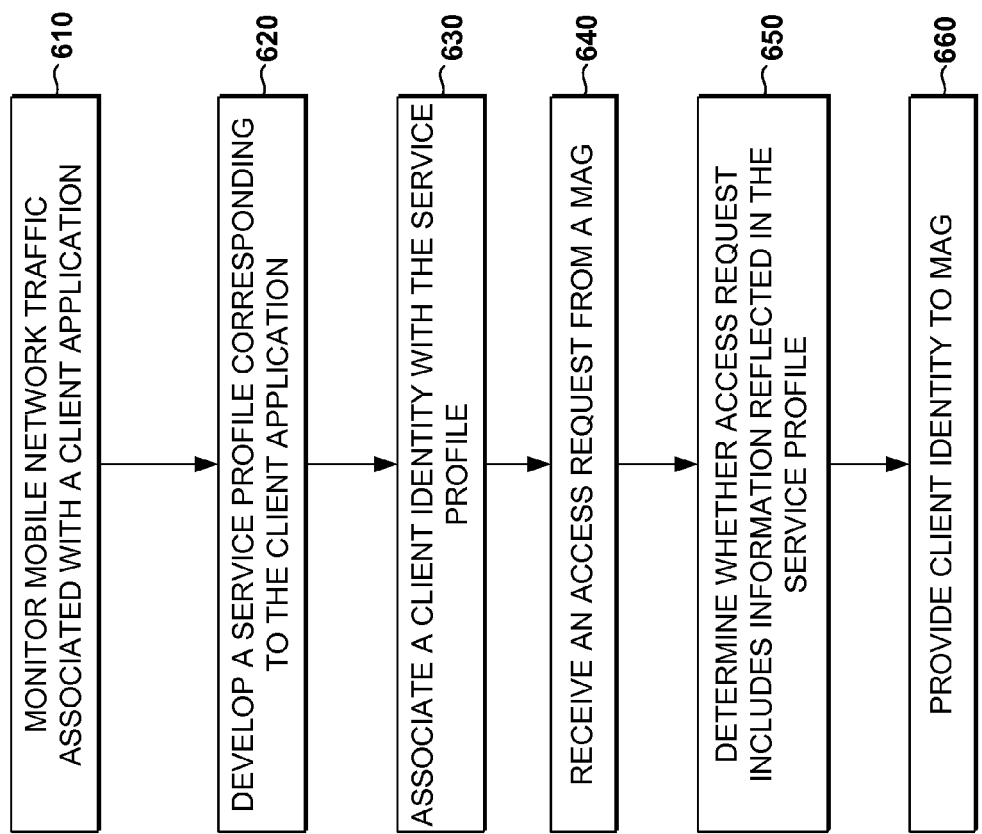
FIG. 6 depicts another illustrative method for identifying a client application installed on a mobile communications device in accordance with embodiments of the present invention.

With reference to a final flow diagram depicted in FIG. 6, an illustrative method for identifying an client application installed on a mobile communications device, wherein the client application is associated with a web-enabled application is shown. At a first illustrative step, step 610, embodiments of the illustrative method include monitoring network traffic associated with an client application. In embodiments, step 610 can include monitoring HTTP traffic flowing to and from an client application and/or a content provider, as well as traffic flowing between various network nodes and the like. At step 620, a service profile corresponding to the client application is developed and a client identity is associated with the service profile, as illustrated at step 630.

As shown at step 640, embodiments of the illustrative method include receiving an access request from a mobile access gateway (MAG). In embodiments, the access request is generated by the mobile communications device and can include a request to access application content from a content provider. At step 650, embodiments of the exemplary method include determining whether the access request includes information reflected in the service profile and, upon determining that the access request does include such information, a final illustrative step, step 660, includes providing the associated client identity to the MAG.

Many different arrangements of the various components depicted, as well as components not shown, are possible without departing from the spirit and scope of the present invention. Embodiments of the present invention have been described with the intent to be illustrative rather than restrictive. A skilled artisan may develop alternative means of implementing the aforementioned improvements without departing from the scope of the present invention.

It will be further understood that certain features and subcombinations are of utility and may be employed without reference to other features and subcombinations and are contemplated within the scope of the claims.

The invention claimed is:

1. One or more nontransitory computer-readable media having computer-executable instructions embodied thereon for performing a method of identifying a client application installed on a mobile communications device, wherein the client application is associated with a web-enabled application, the method comprising:

receiving, at a mobile network node, an application characteristic from the mobile communications device, wherein the application characteristic comprises information about the client application, the client application comprising a client program that communicates with a content provider to facilitate running the application, and wherein running the client application comprises accessing content maintained by the content provider;

determining whether the client application is registered with the mobile network by referencing a listing of registered client applications maintained on the mobile network, wherein when the client application is registered with the mobile network, said determining comprises retrieving a pre-assigned application identifier corresponding to the client application;

providing the mobile communications device with an application identifier corresponding to the client application, wherein when the client application is registered with the mobile network, the application identifier comprises the pre-assigned application identifier;

receiving an access request from a mobile access gateway (MAG), the access request being generated by the mobile communications device, wherein the access request comprises a request to access application content from the content provider;

determining whether the access request includes an identity request header, the identity request header comprising a header that includes an application client identifier corresponding to the client application;

when the access request includes an identity request header, determining whether a custom client identity has been assigned to the client application, the custom client identity comprising an application identifier agreed upon by at least one of a developer of the client application and the content provider; and when a custom client identity has been assigned to the client application, providing the custom client identity to the MAG.

2. The media of claim 1, wherein when a custom client identity has not been assigned to the client application, the method further comprises providing the default application client identifier to the MAG.

3. The media of claim 1, wherein when the access request does not include an application client identifier, the method further comprises:

based on specific header name/value combinations, determining whether the access request corresponds to a recognizable client application that does not have a specific client application identifier ("well-known client application"); and in response to determining that the access request corresponds to the well-known client application, providing a client identity associated with the well-known client application to the MAG.

4. The media of claim 3, wherein when the access request does not correspond to a well-known client application, the method further comprises providing a catch-all client identity to the MAG, the catch-all client identity comprising an identity used to identify client applications in the absence of an assigned client identity.

5. One or more nontransitory computer-readable media having computer-executable instructions embodied thereon for performing a method of registering a client application with a mobile network, the method comprising:

at a mobile communications device ("mobile device"), detecting an installation of the client application on the mobile device, wherein the installation is detected by an application management system that resides on the mobile device, wherein the client application comprises a client program that communicates with a content provider to facilitate access to content associated with the client application;

at the mobile device, designating the client application as a new client application until it is registered with the mobile network, wherein no network traffic is allowed to pass to or from the new client application until it is registered with the mobile network;

at the mobile device, determining an application characteristic of the new client application, the application characteristic comprising information about the new client application, wherein the application characteristic is determined by the application management system;

at the mobile device, providing the application characteristic to a mobile network node, wherein the application characteristic is provided to the mobile network node by the application management system;

at the mobile device, receiving an application identifier from the mobile network node, the application identifier corresponding to the client application, wherein the application identifier identifies the client application;

storing the application identifier in memory on the mobile communications device;

detecting an outbound HTTP request for access to a content provider, the HTTP request originating from the client application;

including a custom client identity request in a header of the HTTP request, the custom client identity request comprising a request for a mobile access gateway (MAG) to substitute the application identifier with a custom client identity, wherein the custom client identity comprises an application identifier agreed upon by at least one of a developer of the client application and the content provider.

6. The media of claim 5, wherein the MAG further includes, in the HTTP request for access, a trust token agreed upon by the content provider, wherein the trust token comprises a value known only to the MAG and the content provider, and wherein the trust token signifies that the identity of the client application can be trusted.

* * * * *